(12) United States Patent
Lobo et al.

(10) Patent No.: US 8,769,506 B2
(45) Date of Patent: Jul. 1, 2014

(54) USING A COMMAND INTERPRETER AT DESIGN TIME

(75) Inventors: Lester Oscar Lobo, Redmond, WA (US); Siridhar Vellanki, Bothell, WA (US); Jeremy Zhou Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1309 days.

(21) Appl. No.: 11/903,717

(22) Filed: Sep. 24, 2007

(65) Prior Publication Data
US 2009/0083718 A1 Mar. 26, 2009

(51) Int. Cl.
*G06F 9/45* (2006.01)

(52) U.S. Cl.
USPC .......................... 717/131; 717/133; 717/144

(58) Field of Classification Search
USPC .................................. 717/104–109, 124–161
See application file for complete search history.

(56) References Cited

U.S. PATENT DOCUMENTS

| | | | | |
|---|---|---|---|---|
| 5,983,019 A * | 11/1999 | Davidson | ...................... | 717/139 |
| 6,002,867 A * | 12/1999 | Jazdzewski | ................... | 717/105 |
| 6,077,312 A * | 6/2000 | Bates et al. | .................... | 717/129 |
| 6,173,246 B1 * | 1/2001 | Billups, III | ...................... | 703/22 |
| 6,286,132 B1 * | 9/2001 | Tanaka et al. | ................. | 717/125 |
| 6,493,868 B1 * | 12/2002 | DaSilva et al. | ............... | 717/105 |
| 6,564,368 B1 * | 5/2003 | Beckett et al. | ................ | 717/113 |
| 6,681,370 B2 | 1/2004 | Gounares et al. | | |
| 6,948,120 B1 | 9/2005 | Delgobbo et al. | | |
| 6,948,150 B1 | 9/2005 | Pepin | | |
| 7,000,220 B1 * | 2/2006 | Booth | .......................... | 717/110 |
| 7,088,374 B2 | 8/2006 | David et al. | | |
| 7,150,001 B1 | 12/2006 | Pepin et al. | | |
| 7,197,701 B2 | 3/2007 | Hofmann | | |
| 2004/0015858 A1 * | 1/2004 | Seto et al. | ...................... | 717/120 |
| 2005/0015732 A1 * | 1/2005 | Vedula et al. | ................. | 715/805 |
| 2005/0022129 A1 | 1/2005 | Borenstein et al. | | |
| 2006/0004873 A1 | 1/2006 | Wong et al. | | |
| 2006/0153097 A1 | 7/2006 | Schultz | | |
| 2006/0206856 A1 * | 9/2006 | Breeden et al. | ............... | 717/101 |
| 2006/0277498 A1 | 12/2006 | Mann et al. | | |

OTHER PUBLICATIONS

Beguelin, A.; Dongarra, J.; Geist, A.; Sunderam, V.; "Visualization and debugging in a heterogeneous environment," Computer, vol. 26, No. 6, pp. 88-95, Jun. 1993.*

(Continued)

*Primary Examiner* — Satish Rampuria
(74) *Attorney, Agent, or Firm* — Tony Azure; Brian Haslam; Micky Minhas

(57) ABSTRACT

Various technologies and techniques are disclosed for using a command interpreter at design time of a software application. A command interpreter can be used to design and test the functionality of an application at design time. The command interpreter allows a user to identify a command to execute for a selected object at design time of an application being developed within a software application design environment. The command interpreter causes the identified command to be executed. A selected object can be sent from a visual tree to the command interpreter. The command interpreter receives the object sent from the visual tree and assigns a designated object name for referencing the object in the command interpreter. The designated object name is displayed within the command interpreter to allow a user to have an abbreviated way of issuing one or more commands for the object from the command interpreter.

5 Claims, 10 Drawing Sheets

(56) References Cited

OTHER PUBLICATIONS

Daniel Schulz et al., A thread-aware debugger with an open interface, vol. 25 Issue 5, Sep. 2000, ACM New York, NY, USA, pp. 201-211.*

Alexander Felfernig et al., Debugging user interface descriptions of knowledge-based recommender applications, ACM New York, NY, USA 2006, pp. 234-241.*

Hoffmann, "An Interpreter Generator Using Tree Pattern Matching", Proceedings of the 6th ACM SIGACT-SIGPLAN symposium on Principles of programming languages, Date: 1979, pp. 169-179, ACM Press, New York, USA.

Hoffmann, "Pattern Matching in Trees", Date: 1982, pp. 68-95, ACM Press, New York, USA.

Steinbrook, "From Trees into Boxes", Proceedings of the international conference on APL, Date: 1993, pp. 267-276, ACM Press, New York, USA.

* cited by examiner

USING A COMMAND INTERPRETER AT DESIGN TIME

BACKGROUND

Software application developers create software by writing source code using one or more software development programs. A typical process for creating application software involves writing the source code, compiling the software, and running the software. Most software development programs provide debugging tools that allow the developer to design, test or otherwise debug the operation of the software under development. For example, the developer can set breakpoints on one or more lines of code. After compiling the source code and running the program from the software development program, the execution of code pauses when the breakpoint is hit. The developer can then view the status of various items at that given moment in time, such as the value that certain variables contain, and/or the developer can take other actions to further view or manipulate the execution of the program at runtime.

SUMMARY

Various technologies and techniques are disclosed for using a command interpreter at design time of a software application. A command interpreter can be used at design time by a user to test the functionality of an application from within the software application design environment. The command interpreter allows a user to identify a command to execute for a selected object at design time from within a software application design environment. For example, the user can select or type a procedure name for execution at design time. As another example, the user can type one or more lines of code to execute at design time. The command interpreter then causes the identified command to be executed.

In one implementation, a selected object can be sent from a visual tree to the command interpreter. The command interpreter receives the object sent from the visual tree and assigns a designated object name for referencing the object in the command interpreter. The designated object name is displayed or otherwise used within the command interpreter to allow a user to have an abbreviated way of issuing one or more commands for the object from the command interpreter.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as a software development application, but the technologies and techniques also serve other purposes in addition to these. In one implementation, one or more of the techniques described herein can be implemented as features within a software development application such as MICROSOFT® VISUAL STUDIO®, or from any other type of program or service that allows for design, development and/or testing of software applications.

Figure 1:
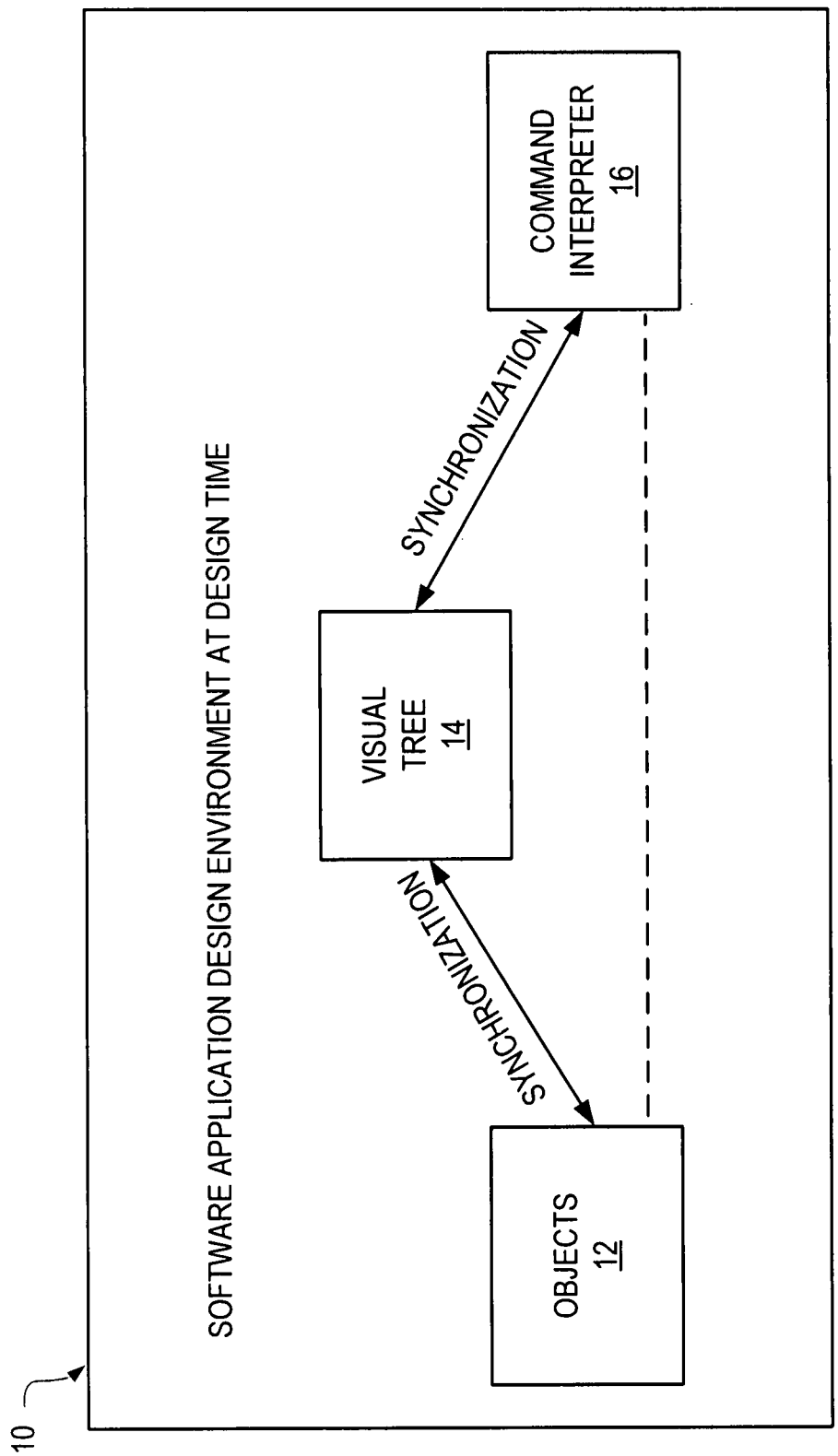
FIG. 1 is a diagrammatic view of a software application design environment at design time of one implementation.

FIG. 1 is a diagrammatic view of a software application design environment 10 at design time of one implementation. The term "software application design environment" as used herein is meant to include a design time view of a software development application that can be used to design software. The term "design time" as used herein is meant to include a time during which the user is working on creating and/or testing the source code for the application, such as during the coding phase and/or the testing phase of an application life cycle. In the example shown, software application design environment 10 includes one or more objects 12, a visual tree 14, and a command interpreter 16. The term "command interpreter" as used herein is meant to include a utility or feature that allows a user to issue commands against a specified object. The term "object" as used herein is meant to include objects and their associated component parts, whether visible or hidden to the user, such as listboxes, combo boxes, tree structures, radio buttons, calendars, windows, forms, panels, rich text boxes, caret position of rich text boxes, static objects, and combinations thereof. New implementations of objects are being constantly created and these examples disclosed also embrace objects that have not specially been named. The term "visual tree" as used herein is meant to include a visual representation of one or more details about one or more objects contained in an application under development. In one implementation, a synchronization process is used to keep the visual tree 14 updated with the objects 12 contained in the design environment, as described in further detail in FIG. 6. The design time view of objects 12 in the design environment can be interactive and/or static. For example, with an interactive view, a user can put a new object into the design environment and then start interacting with it, such as by typing text into a text box from within the design environment. With a static view, a user can place a new object into the design environment, but cannot start interacting with it immediately without taking a further action.

As described in further detail in various later figures, the command interpreter 16 can be used to issue commands for performing operations on one or more of the objects 12 at design time of an application under development. Some or all of these techniques allow the user to test small pieces of the application while working on that aspect within the software application design environment. In one implementation, the command interpreter 16 interacts with the visual tree 14 to allow the user to more easily test functionality of objects at design time. For example, a particular object can be selected from the visual tree 14, and sent to the command interpreter 16. Once the command interpreter receives the selected object, that object is set as the current object upon which the command interpreter will operate. The user can then enter commands directly into the command interpreter as one or more individual lines of source code that should be performed against the selected object. Alternatively or additionally, the user can identify for execution an existing procedure containing one or more lines of source code, and/or can select a subset of that existing source code. This synchronization between the visual tree and the command interpreter is described in further detail in other figures, including FIG. 7.

Figure 2:
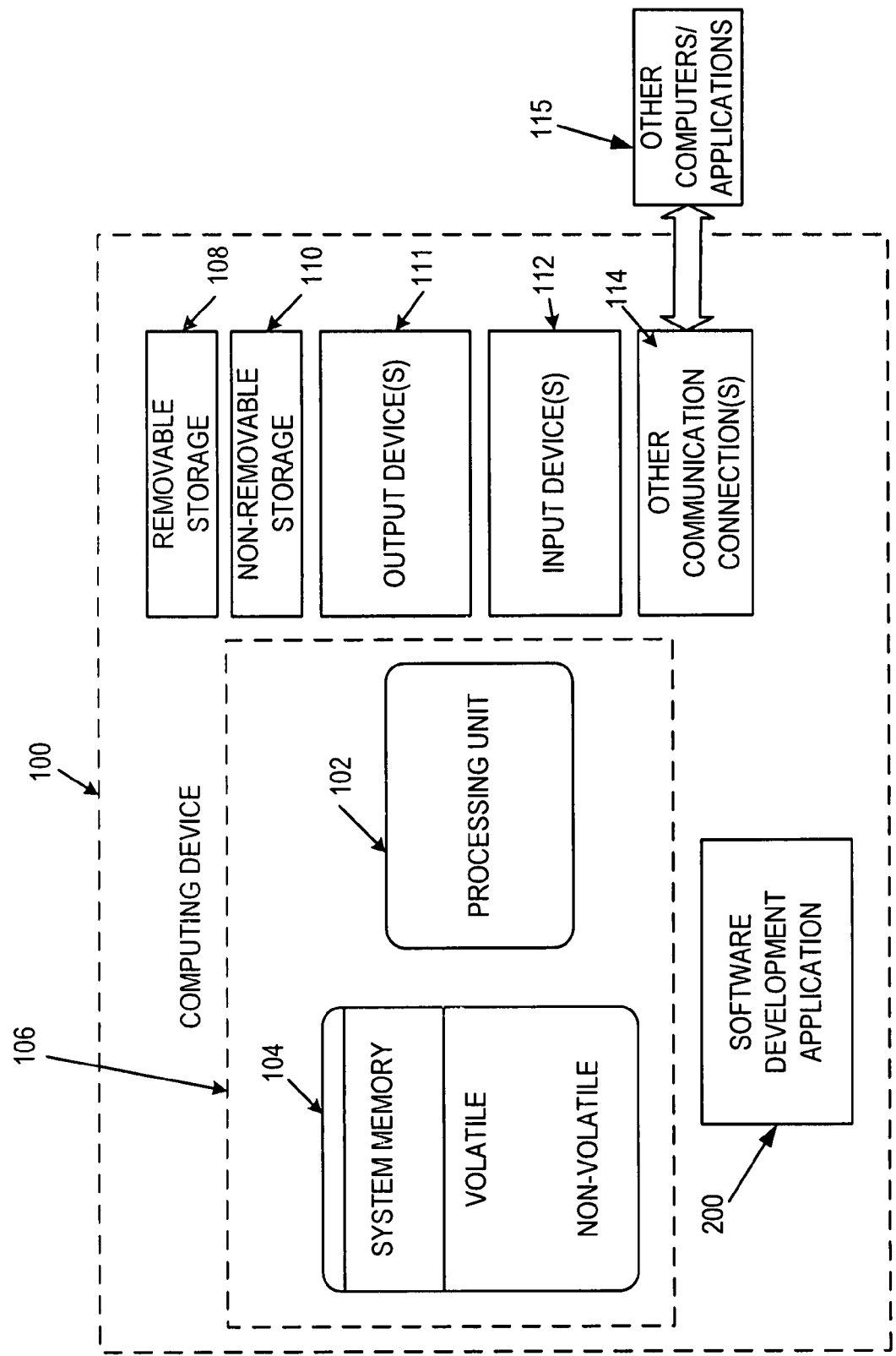
FIG. 2 is a diagrammatic view of a computer system of one implementation.

Turning now to FIG. 2, an exemplary computer system is shown that can be used for implementing one or more parts of the system that includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes software development application 200. Software development application 200 will be described in further detail in FIG. 3.

Figure 3:
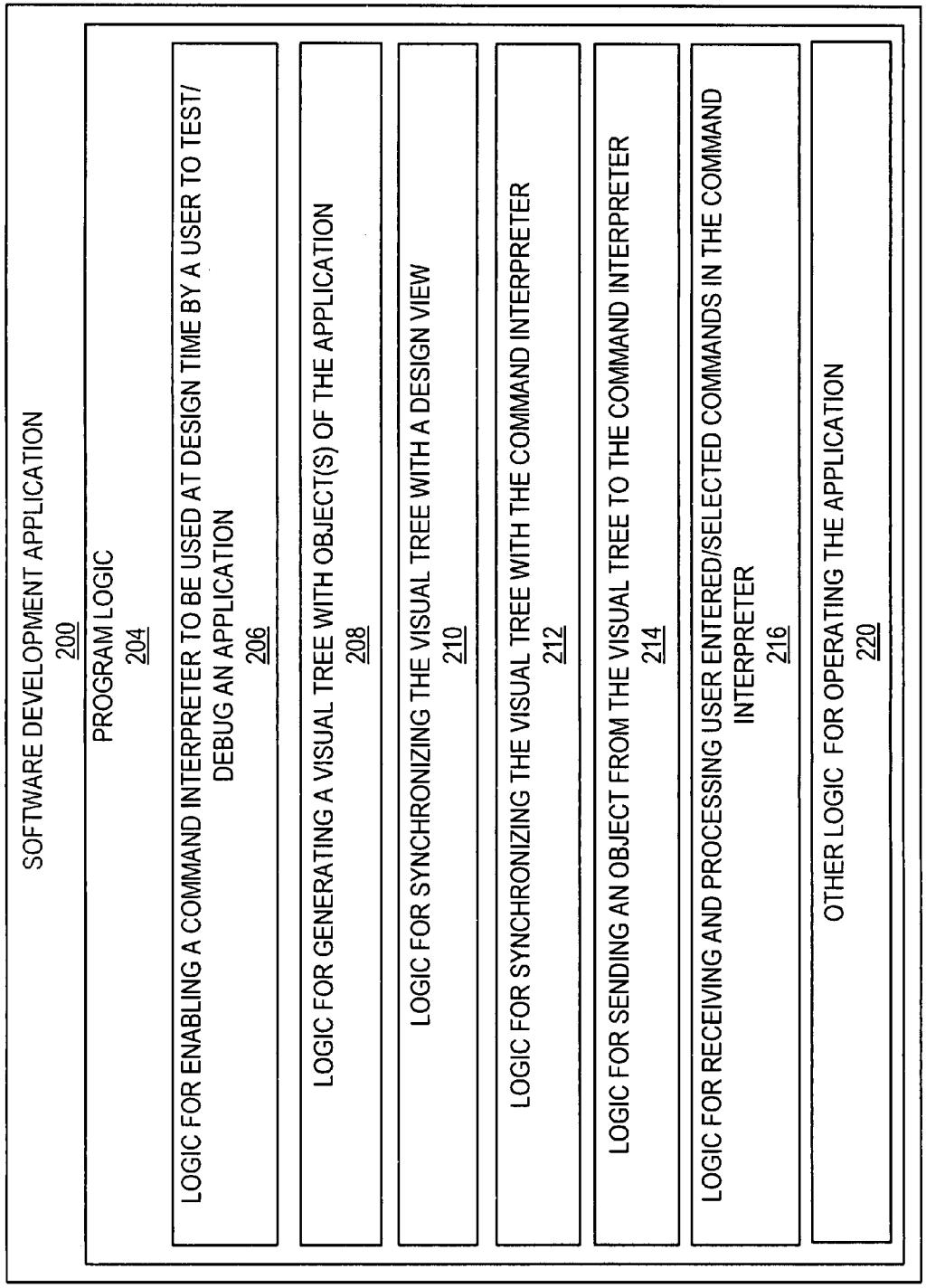
FIG. 3 is a diagrammatic view of a software development application of one implementation operating on the computer system of FIG. 2.

Turning now to FIG. 3 with continued reference to FIG. 2, a software development application 200 operating on computing device 100 is illustrated. Software development application 200 is one of the application programs that reside on computing device 100. However, it will be understood that software development application 200 can alternatively or additionally be embodied as computer-executable instructions on one or more computers and/or in different variations than shown on FIG. 3. Alternatively or additionally, one or more parts of software development application 200 can be part of system memory 104, on other computers and/or applications 115, or other such variations as would occur to one in the computer software art.

Software development application 200 includes program logic 204, which is responsible for carrying out some or all of the techniques described herein. Program logic 204 includes logic for enabling a command interpreter to be used at design time by a user to test/debug an application 206 (as described below with respect to FIG. 4); logic for generating a visual tree with object(s) of the application 208 (as described below with respect to FIG. 5); logic for synchronizing the visual tree with a current design view 210 (as described below with respect to FIG. 6); logic for synchronizing the visual tree with the command interpreter 212 (as described below with respect to FIG. 7); logic for sending an object from the visual tree to the command interpreter 214 (as described below with respect to FIG. 8); logic for receiving and processing user entered/selected commands in the command interpreter 216 (as described below with respect to FIG. 8); and other logic 220 for operating the software development application 200.

Figure 4:
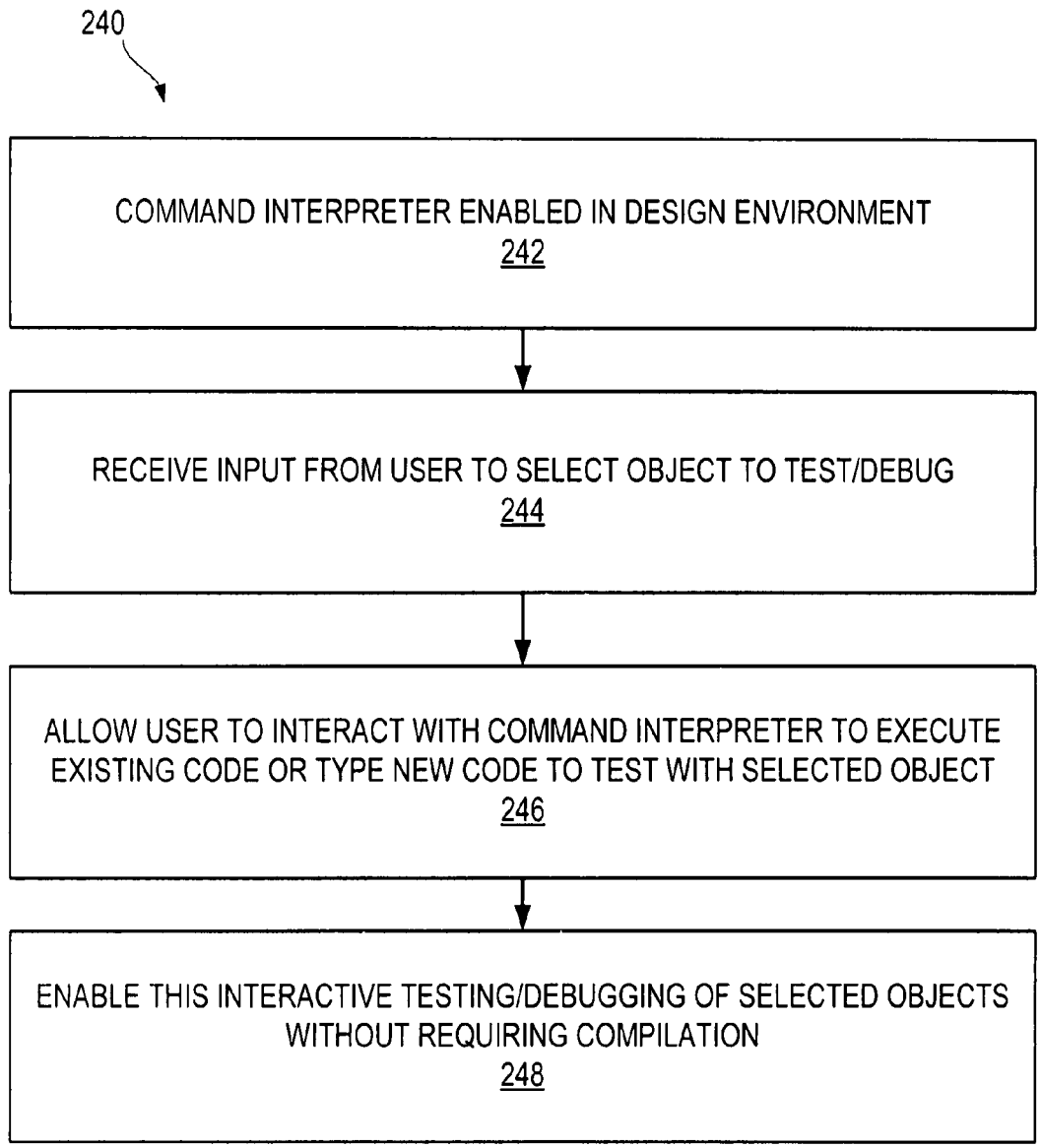
FIG. 4 is a process flow diagram for one implementation illustrating the stages involved in enabling a command interpreter in a design environment.
Figure 10:
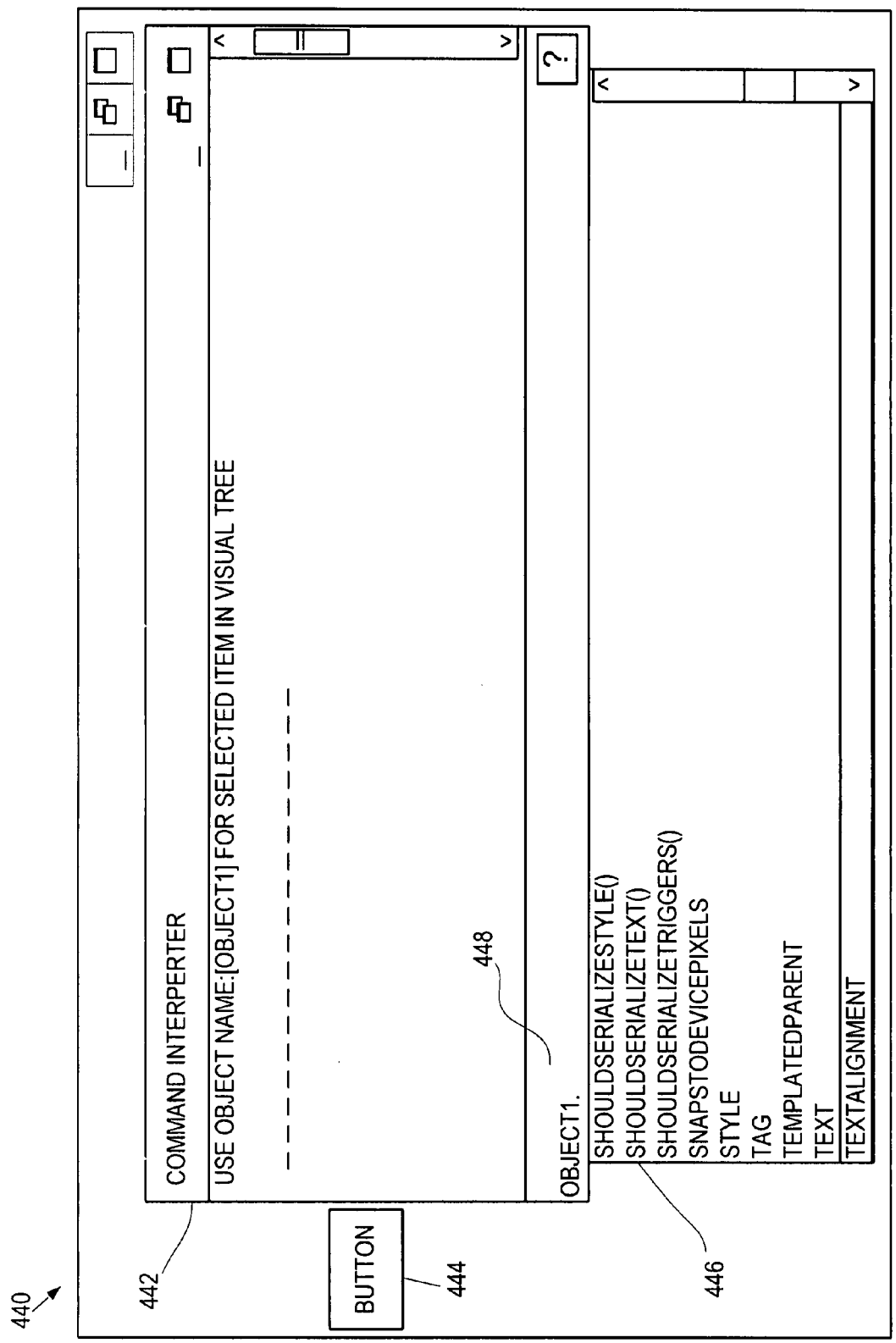
FIG. 10 is a simulated screen for one implementation that an exemplary command interpreter used during design time.

Turning now to FIGS. 4-8 with continued reference to FIGS. 1-3, the stages for implementing one or more implementations of software development application 200 are described in further detail. FIG. 4 is a process flow diagram 240 that illustrates one implementation of the stages involved in enabling a command interpreter 16 in a design environment of a software development application (stage 242). The system receives input from a user, such as a software developer, to select an object within an application under development to test or debug at design time (stage 244). In one implementation, the user selects an object from the visual tree 14 of objects. In another implementation, the user can type an object name or other object identifier directly into the command interpreter 16. The user can interact with the command interpreter 16 to execute existing code of the application against the selected object and/or the user can type new code to the test against the selected object (stage 246). A simulated screen that illustrates an exemplary operation of the command interpreter 16 is shown in FIG. 10. By enabling the command interpreter 16 at design time, interactive testing and/or debugging of selected objects can be performed without requiring compilation of the application under development (stage 248).

Figure 5:
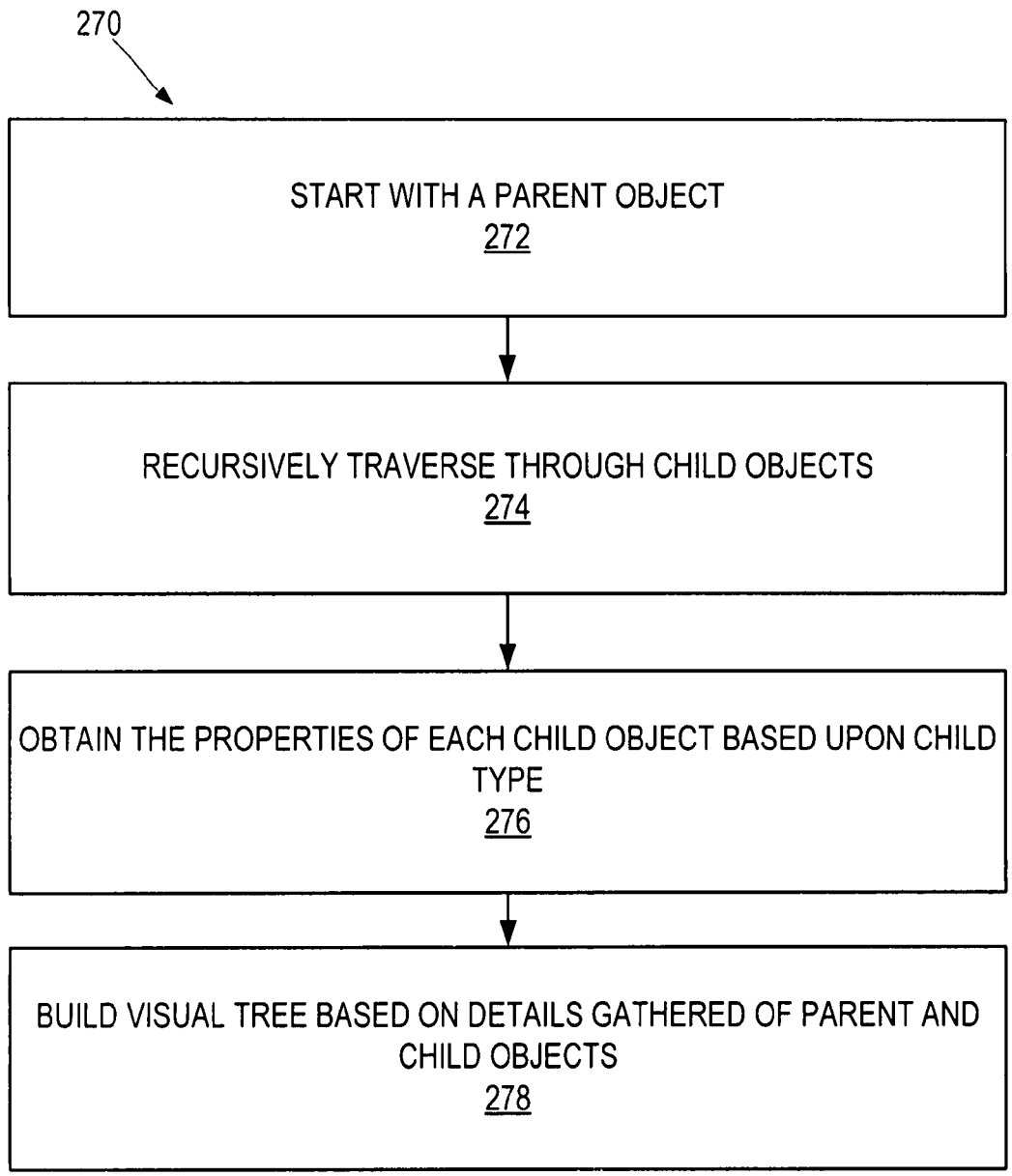
FIG. 5 is a process flow diagram for one implementation illustrating the stages involved in generating a visual tree with object(s) of an application.

FIG. 5 is a process flow diagram 270 that illustrates one implementation of the stages involved in generating a visual tree 14 with object(s) of an application. Starting with a parent object (stage 272), the system recursively traverses through child objects of the parent object (stage 274). One or more properties are obtained for each child object based upon the child type (stage 276). In one implementation, these properties are obtained using a reflection process that inspects the type of object and gathers certain details about what all objects of that type will contain. A visual tree 14 is then generated based upon the details gathered of the parent and child objects (stage 278). This visual tree is then displayed to the user in the software application design environment.

The following example is illustrative of how a visual tree 14 is generated using the techniques described in FIG. 5. Suppose the application contains just a single form that has just a single button object on it. Starting with the parent, which is the form object, the system traverses through the child object nodes. For each child object, the type of object is retrieved, and then one or more properties of that child object are retrieved based on the identified type of object. In one implementation, this process is repeated for each child node to build the visual tree 14. In another implementation, the visual tree 14 only contains some subset of the objects contained under the parent. For example, if the application is extremely large and complex, a given parent object may have hundreds of children. In such a scenario, the subset of objects that are shown in the visual tree 14 can be appropriate for the context, such as the currently displayed objects in the designer. A graphical illustration of the visual tree generated in this hypothetical example is shown in the simulated screen of FIG. 9.

Figure 6:
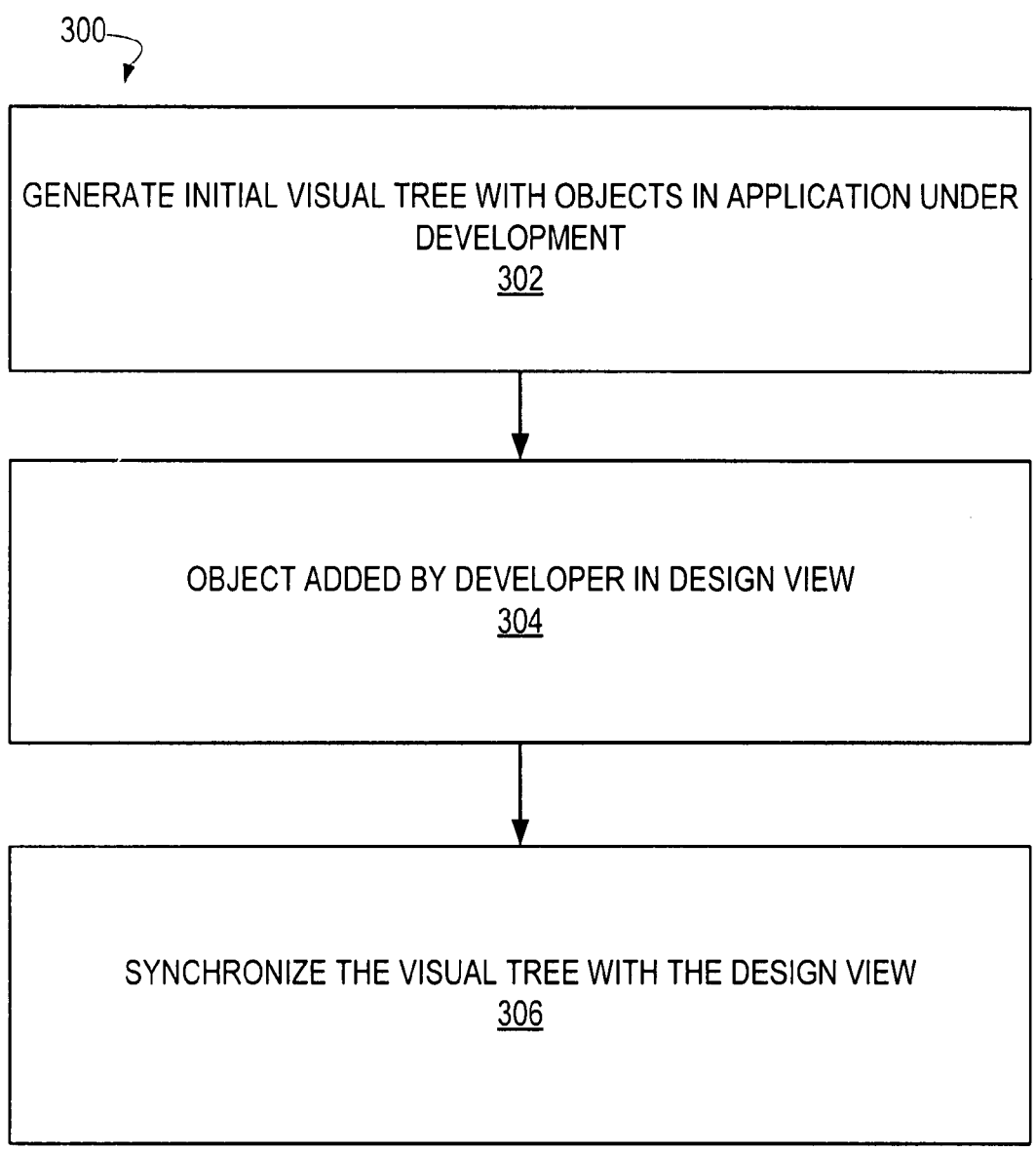
FIG. 6 is a process flow diagram for one implementation illustrating the stages involved in synchronizing a visual tree with a design environment.

Turning now to FIG. 6, a process flow diagram 300 is shown that illustrates one implementation of the stages involved in synchronizing a visual tree with a design environment. The command interpreter generates an initial version of the visual tree 14 showing the objects in the application under development (stage 302). When another object is added by the developer in design view (stage 304), the system synchronizes the visual tree with the design view (stage 306). In other words, some or all of the stages described in FIG. 5 are performed to update the visual tree with the newly added object details.

Figure 7:
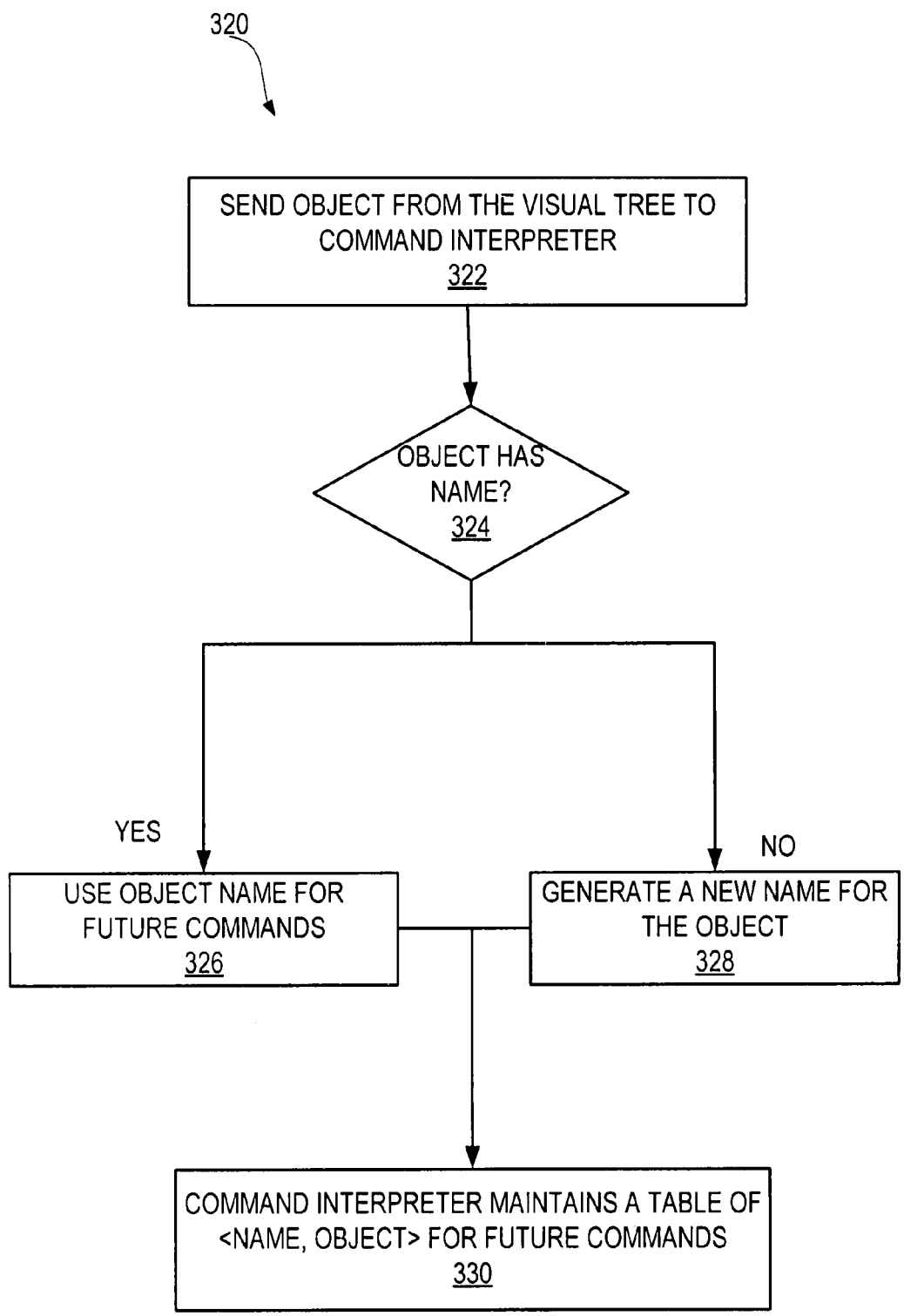
FIG. 7 is a process flow diagram for one implementation illustrating the stages involved in synchronizing a visual tree with a command interpreter.

Turning now to FIG. 7, a process flow diagram 320 is shown that illustrates one implementation of the stages involved in synchronizing a visual tree 14 with a command interpreter 16. An object is sent from the visual tree 14 to the command interpreter 16 (stage 322), such as upon user selection. The object received from the visual tree 14 is assigned a designated object name to be used for referencing the object in the command interpreter 16, and the designed object name is displayed in the command interpreter 16. For example, if the object already has a name (decision point 324), then that object name is used for future commands in the command interpreter 14 (stage 326). If the object does not already have a name (decision point 324), then a new name is generated for the object (stage 328), and that new name is used for future commands. In one implementation, the command interpreter maintains a table of names and objects to use with identifying the objects in future commands (stage 330).

Figure 8:
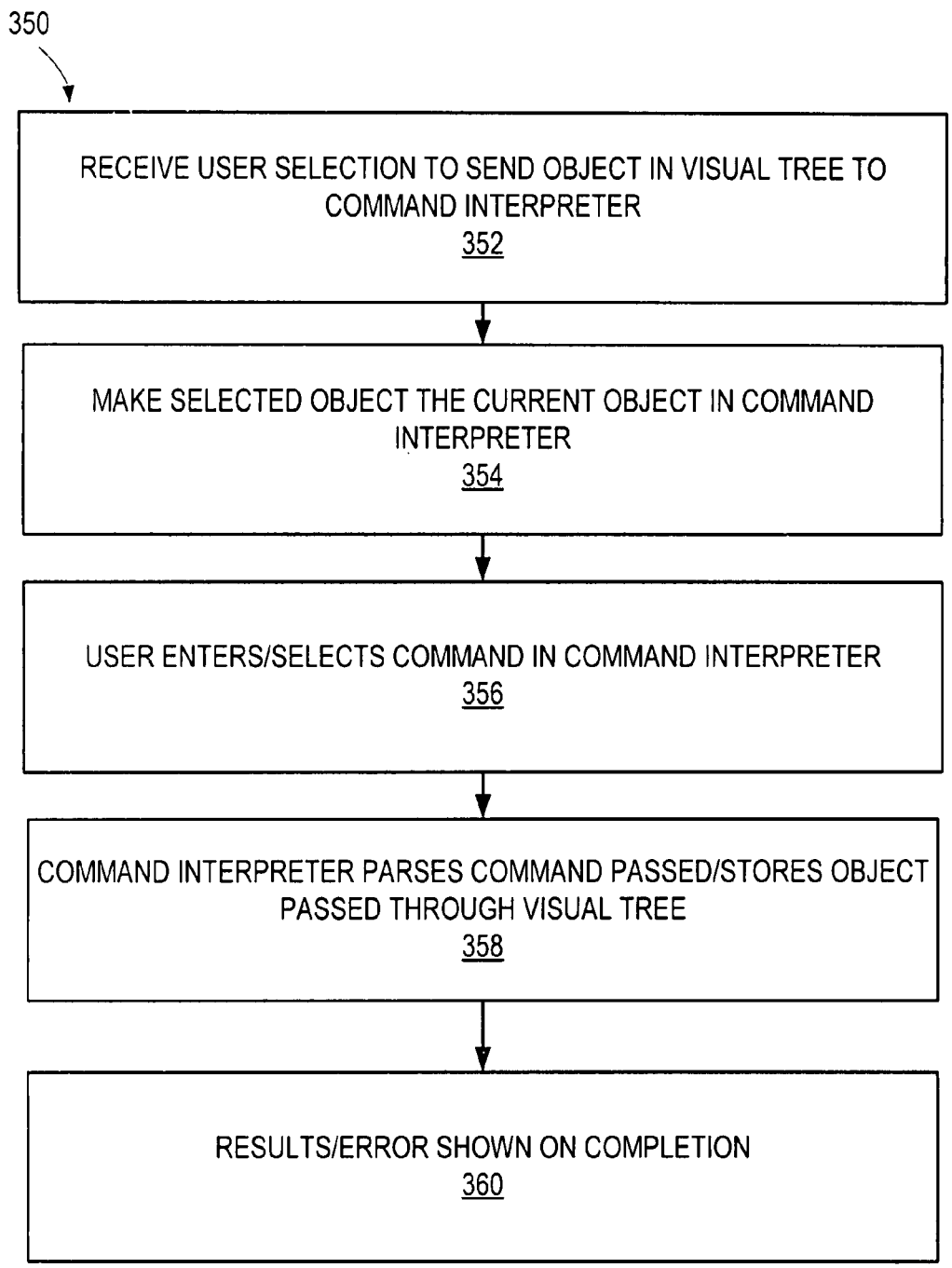
FIG. 8 is a process flow diagram for one implementation that illustrates the stages involved in using the visual tree and command interpreter to execute commands against selected objects.

Once the designated object name is assigned for the object, using whatever assignment technique is determine appropriate, then the user can issue commands against the object in the command interpreter 16 using an abbreviated way of issuing commands. For example, the user can choose a command to issue against the selected object from a command selection list that contains the available commands that can be performed on that object. As another example, the user can directly type in the command syntax for one or more commands to be executed against the selected object, but with using the designated object name as an abbreviation (as opposed to the much longer name that may actually represent the object). Take a rich text box, for example. Suppose that the user wants to issue a command for performing some operation on an inlinecollection of the rich text box. A complete description for such an object might be rtb.Document.Blocks.FirstBlock.Inlines. By sending the object from the visual tree 14 to the command interpreter 18, the object is given the designated object name. Suppose in this instance that designated object name is object1. In the command interpreter 16, the user can now simply refer to the inlinecollection as object1 instead of the much longer object description shown above. Use of the designated object name thus provides an abbreviated way of issuing commands in the command interpreter 16. FIG. 8 describes a process illustrating how the user can issue commands upon objects in further detail.

FIG. 8 is a process flow diagram 350 that illustrates one implementation of the stages involved in using a visual tree 14 and command interpreter 16 to execute commands against selected objects. The system receives the user's selection to send an object in the visual tree 14 to the command interpreter 16 (stage 352). The selected object is designated as the current object in the command interpreter (stage 354). The user enters or otherwise selects a command in the command interpreter to perform against the selected object (stage 356). The command interpreter parses the command passed and optionally stores the object passed through the visual tree (stage 358). The result of the operation is shown on completion (stage 360), which can indicate success or an error occurrence.

Figure 9:
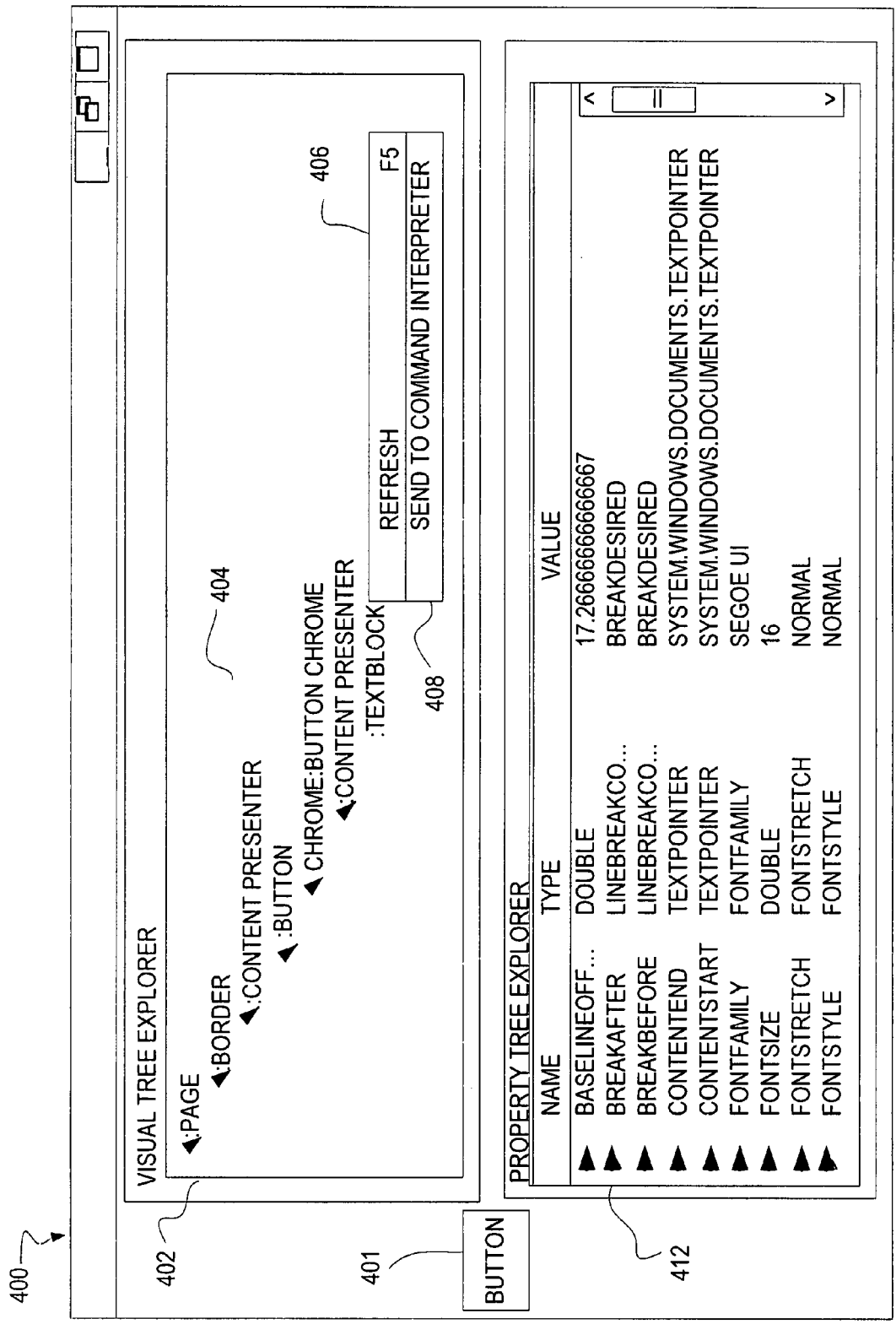
FIG. 9 is a simulated screen for one implementation that illustrates an exemplary visual tree used during design time.

Turning now to FIGS. 9-10, simulated screens are shown to illustrate an exemplary user interface that allows a user to issue commands against objects at design time using a visual tree 14 and command interpreter 16. These screens can be displayed to users on output device(s) 111. Furthermore, these screens can receive input from users from input device(s) 112.

FIG. 9 illustrates a simulated screen 400 showing an exemplary visual tree 402 (14 on FIG. 1) used during design time. In the example shown, the application under development is a simple application that contains a single form and a single command button 401. The visual tree 402 contains various details 404 about the objects contained in the simple application. The user can select a refresh option 406 to refresh the visual tree. Alternatively or additionally, the user can select an option to send the selected object to the command interpreter 408. An optional property tree 412 is also shown that provides additional details about the properties of the selected object.

Upon selecting the option to send the selected object to the command interpreter 408, a screen 440 similar to FIG. 10 is shown. The command interpreter 442 (16 on FIG. 1) shows the designated object name that was assigned to the object. As described previously, that designated object name can be a name that was already given to the object previously, or it can be assigned by the command interpreter or other suitable process. The command entry area 448 of command interpreter 442 allows the user to type and/or select commands to execute against the selected object. In this example, the selected object is the command button 444. In the example shown, a listing of commands that are available for the selected object are shown in the command list 446. Many of the commands shown in the command list 446 are properties that can be set for the selected object. As described previously, commands can be lines of code directly entered by the user, commands can be changes made to properties of an object, and/or commands can be calls to existing procedures or lines of code within an application under development.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-readable hardware device having computer-executable instructions for causing a computer to perform steps comprising:

enabling a command interpreter to be used at design time by a user to test a functionality of an application from within a software application design environment;

enabling a selected object to be sent from a visual tree to the command interpreter, wherein the visual tree is generated by recursively traversing through child objects of the selected object, and obtaining one or more properties for each child object via a reflection process that inspects an object type;

displaying the visual tree to the user in the software application design environment;

synchronizing the visual tree with a current design view in the software application design environment;

setting the selected object as a current object in the command interpreter upon being received from the visual tree; and performing an operation to test the functionality of the application on a particular command interpreter object designated as the current object during design time, the operation performed via at least one command entered directly into the command interpreter and without a compilation of the application.

2. The computer-readable hardware device of claim 1, the steps further comprising:

synchronizing the visual tree with the command interpreter.

3. The computer-readable hardware device of claim 1, wherein the visual tree and the command interpreter are operable to provide an abbreviated manner of issuing commands against the selected object.

4. A method comprising:

displaying a software application design environment, the software application design environment facilitating a testing of objects included in an application;

moving a selected object included in the application from a visual tree to a command interpreter, wherein the visual tree is generated by recursively traversing through child objects of the selected object, and obtaining one or more properties for each child object via a reflection process that inspects an object type;

displaying the visual tree in the software application design environment;

synchronizing the visual tree with a current design view in the software application design environment;

setting the selected object as a current object in the command interpreter upon being received from the visual tree; and performing an operation to test a functionality of the application on a particular command interpreter object designated as the current object during design time, the operation performed via code entered directly into the command interpreter and without a compilation of the application.

5. A software development system comprising:

a processor configured to execute an application; and a design environment configured to facilitate a testing of objects included in the application, the design environment including;

a visual tree component configured to provide a visual representation of at least one of the objects included in the application, the visual representation facilitating moving a selected object from a visual tree representation of the selected object to a command interpreter representation of the selected object, wherein the visual tree is generated by recursively traversing through child objects of the selected object, and obtaining one or more properties for each child object via a reflection process that inspects an object type, and wherein the visual tree is synchronized with a current design view in the design environment; and a command interpreter component configured to perform an operation to test a functionality of the application on a particular command interpreter object designated as a current object during design time without a compilation of the application, the command interpreter component further configured to set the selected object as the current object within a command interpreter upon being received from a visual tree.

* * * * *